Nov. 25, 1941.  H. L. HUNTER  2,264,080
CONTACT LENS
Filed July 28, 1939  2 Sheets-Sheet 1

Inventor
Hugh L. Hunter.
Attorney.

Nov. 25, 1941.   H. L. HUNTER   2,264,080
CONTACT LENS
Filed July 28, 1939   2 Sheets-Sheet 2
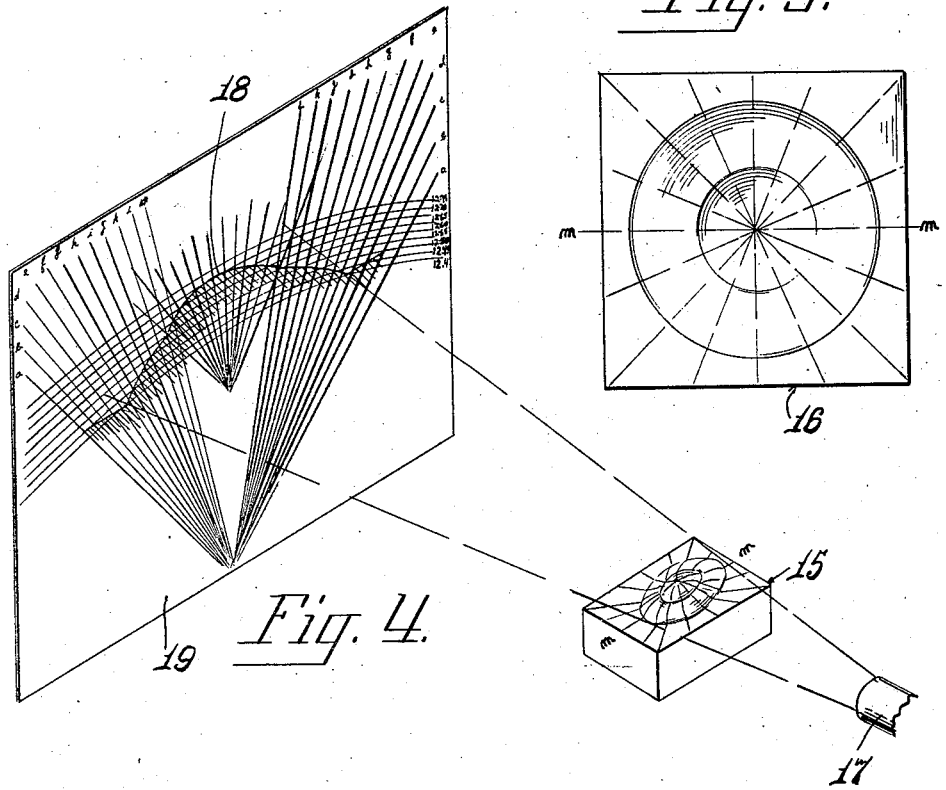
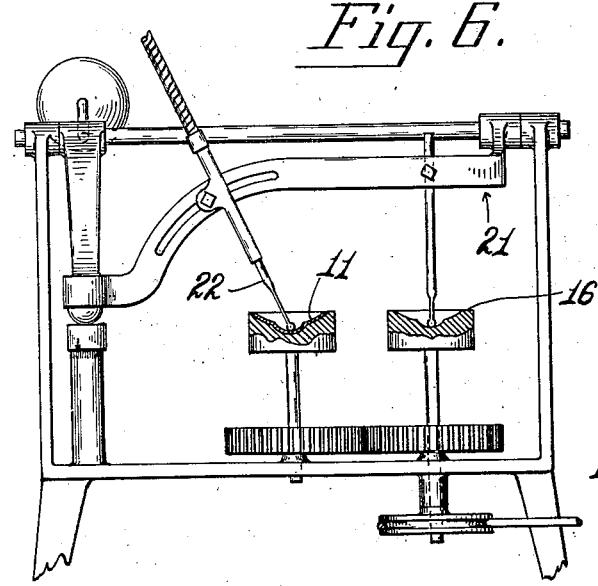
Inventor.
Hugh L. Hunter.
Elmer L. Gwickel
Attorney.

Patented Nov. 25, 1941

2,264,080

UNITED STATES PATENT OFFICE 2,264,080

CONTACT LENS

Hugh L. Hunter, Chicago, Ill.

Application July 28, 1939, Serial No. 287,094

3 Claims. (Cl. 88—54.5)

The invention relates to improvements in contact lenses and more particularly to fitted annularly curvilinear concavo-convex lenses.

Known methods of manufacturing concavo-convex contact lenses are: by blowing, by grinding pressed blanks or, by molding and then grinding the corneal part. Another known type of contact lens is formed with a plastic sclerotic part and a glass corneal part. Blown lenses, although polished, are not always uniform in thickness and, when visual correction is indicated, a spot is formed on the exterior surface of the corneal part.

In each of the above noted types of lenses, the interior surface of the concavo-convex corneal part is semi-spherical and in all except the molded type, the interior surface of the sclerotic part is formed semi-spherical. Obviously, concavo-convex lenses formed semi-spherical do not properly fit all patients because only a very few have semi-spherical eyeballs. In the majority of cases, the eyeballs are irregular or astigmatic (annularly curvilinear). In the irregular or astigmatic sclera case, a semi-spherical lens tends to rock on the part of the flattest meridian leaving clearance at the part where the meridian curvature is the greatest. As a result, the lens frequently becomes misplaced.

In such an event the corneal sclera junction or limbus, as well as the corneal part, frequently contact the eyeball to the discomfort of the patient. If the contact pressure is sufficient, the blood vessels are impinged or their normal functioning is impaired. An improperly fitted lens does not correct retinal or lenticular astigmatism or prismatic defects.

It is therefore, an object of the invention to provide a concavo-convex lens ground along continuous plotted curves to fit an irregular or astigmatic sclera and correct retinal and lenticular astigmatism and prismatic defects.

Another object is to provide a contact lens with annularly curvilinear concavo-convex corneal and sclerotic parts to insure an accurate physical and optical fit.

Another object is to provide a method whereby a contact lens may be ground curvilinear annularly and meridionally.

The foregoing and such other objects of the invention as will become more apparent hereinafter, will be more readily understood from a perusal of the following specification, in which reference is made to the accompanying drawings, wherein:

Fig. 4 is a schematic view illustrating the projection of a silhouette of the cast.

Fig. 5 is a plan view of a matrix.

Fig. 6 is an elevational view of a grinding machine, showing parts in section.

Figure 1:
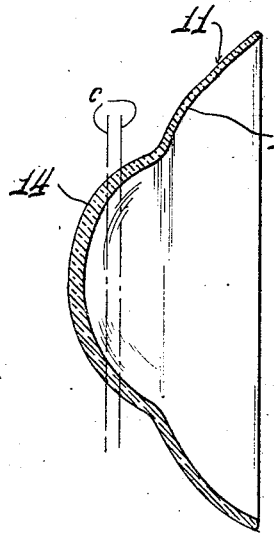
Fig. 1 is a central sectional view of a curvilinear contact lens.

In fitting a lens to a patient, a semi-spherical or toric trial lens is used in determining the refraction and visual acuity. The findings are recorded to aid in making a fitted contact lens 11 of the correct power.

Then a mold, preferably consisting of an elastic substance known to the trade as negocoll, is made of the eyeball. Next, a plaster cast 15 is made from the mold and subsequently altered to provide for the essential corneal and limbus clearances and the previously determined refraction and visual acuity or correcting power.

A matrix 16 is made after the altered cast has set and hardened. It may be made of any suitable material, such as for example, cast stone, low fusion metal, plaster electroplated, or any suitable plastic rosin compound. The matrix may be formed directly on the cast; that is, full size, or should an enlarged matrix be desired, the cast is positioned before an opaque projector 17 and intermittently repositioned so as to project a silhouette 18 of each of a plurality of meridional contours onto a calibrated chart 19. A record of the charted contours is made in a manner hereinafter described, and subsequently used to build up an accurate matrix considerably larger than the cast.

The matrix 16, either full size or enlarged, is then placed on a grinding machine 21, the details of which constitute no part of the present invention, to serve as a guide for its grinder element 22. A pressed glass lens blank 11, is then placed in said machine and ground on one surface. The grinder element is guided thereover by the irregular contour of the matrix. Another matrix is made for use to guide the grinder element over the other surface of the lens, allowance being made, in said second matrix, for the required correctional power as calculated from the use of the trial lens.

Obviously, the finished lens conforms to and snugly embraces the sclerotic contour of the eyeball, irrespective of whether or not the sclera is semi-spherical, irregular or astigmatic, and embodies the required correctional power and the necessary clearances over the cornea and limbus to avoid contact therewith.

It is apparent that the lens, ground to conform to an irregular or astigmatic sclera and to include the required correctional power, is ground on irregular curves. In other words, at least its interior or concave surface is curvilinear annularly and meridionally. The exact contour of each meridional curve need not be individually determined or calibrated in the event that a matrix of full size is to be used, but the calibration readings obtained from the projection chart 19 and recorded for use in making the enlarged matrix should be retained for future lens replacement. The calibration of each meridional contour is accurately identified with reference to the corresponding meridian of the eyeball by suitably marking the meridians (as illustrated by dot-dash lines "m" on lens 11 of Fig. 2 and matrix 16 of Fig. 5) and projecting the silhouette of the cast, at these meridians only, upon the chart. Obviously, more meridians than those illustrated may be employed.

Figure 3:
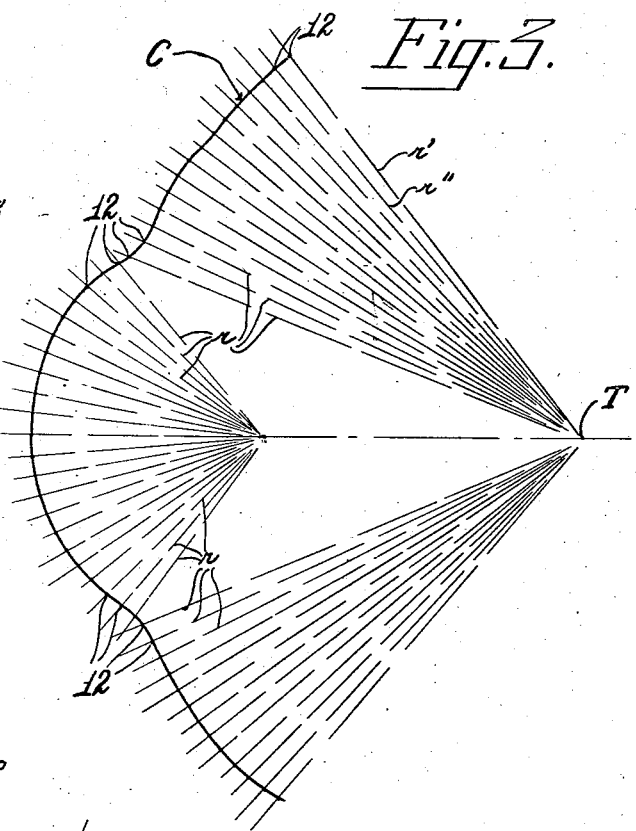
Fig. 3 is a diagram of the plotted meridional contour.

Fig. 3 illustrates the plotting of one meridional contour to correspond to the contour of a meridional silhouette 18 of the cast 15. As shown, two sets of uniformly spaced radial lines r are used to plot the corneal and the sclerotic meridional curves. Each radial line r is marked at a point 12 corresponding to the length of a corresponding line on the silhouette chart 19. For example, the radial line r' may measure 12.5 mm. from its terminal T to its point 12. The point 12 on the next line r'' may measure 12.55 mm. from said terminal, the next point 12.00 mm. from said terminal, etc. This measuring and marking continues until all contour points 12 on both sets of radial lines r are recorded. The curve C is then plotted to pass through each point 12 and is an exact reproduction of the contour of the silhouette. This curve is used to form the proper meridional contour of the matrix 16.

Measuring and plotting is repeated until each contour, obtained by projecting different meridional silhouettes of the cast, is reproduced and subsequently reconstructed in the enlarged matrix.

Obviously, the interior and exterior surfaces of the matrix are not semi-spherical but are curvilinear both annularly and meridionally due to the many plotted curves constituting its various meridional and annular contours.

A lens 11 ground to conform to such a matrix is physically and optically correct as distinguished, for example, from a blown lens which, although blown to conform to a mold, is effected by shrinkage and polishing. Such shrinkage and subsequent polishing clearly changes the lens contour, perhaps but slightly. Since the difference between an accurate fit and a miss-fit is extremely minute, such a lens frequently is highly objectionable.

Figure 2:
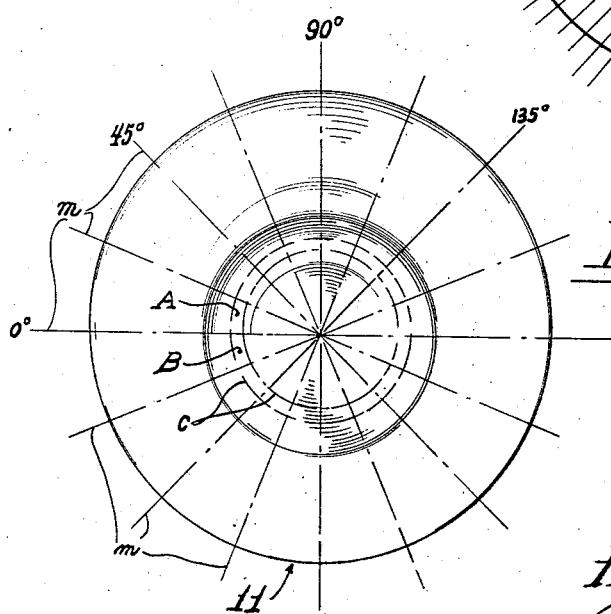
Fig. 2 is an inside plan view of the lens embodying the invention.

As illustrated in Figs. 1 and 2, both the interior and the exterior surfaces 13 and 14 respectively, of the improved lens 11 are curvilinear; both annularly and meridionally. In the lens illustrated, the curvature of the area A defined by meridional lines M and curvilinear lines c, extending in an annular direction, may be on a greater radius than the area b circumferentially adjacent thereto. Similarly, the curvatures of the various adjacent areas in all directions may vary according to the exact annular and meridional curvilinear contour of the matrix which is an exact reproduction of the eyeball contour as modified to provide for the required clearances and correctional power.

While grinding the interior or concave surface, the area formed by the shortest radius is ground first and its longer radii later, whereas while grinding the exterior or convex surface, the area formed by the longest radius is ground first and the shortest radii later.

Inasmuch as the various areas A, B, etc., are each exceedingly small and each includes portions of plotted curves defining an irregular parabola, no line of demarkation is present at the juncture of adjacent areas.

Although a cast preferably is made from a mold of the eyeball, as hereinbefore described, it should be obvious that should the eyeball be but slightly curvilinear, the necessary matrix can be constructed with reasonable accuracy from the calculations and observations obtained during use of the trial lens.

It should be understood; that, while the meridional lines m are illustrated in association with the lens, said lines do not appear thereon but are marked upon the cast prior to making the matrix; that, the disclosure as a whole is illustrative only and not restrictive and; that, the invention embodies such variations in detail and procedure as may readily fall within the spirit of the invention and the scope of the appended claims.

I claim:

1. The method of producing a one piece concavo-convex lens which consists of making a negative mold of the contour of an eyeball over which the finished lens is to be fitted, making a positive cast from said mold, modifying the contour of said cast to include necessary corneal and limbus clearances and any indicated correctional power, marking a plurality of meridional lines on said cast, placing said modified cast before a projector and projecting a silhouette of its contour along one of its meridians onto a calibrated chart, recording the readings obtained from said chart, successively repositioning said cast before said projector and projecting silhouettes of its contours along other meridians onto said chart, recording the readings obtained thereby, plotting a curve of each silhouette, making a negative matrix embodying the contours of said plotted curves, and finally placing said matrix in a grinding machine to guide its grinder over the surface of a lens blank.

2. The method of producing a concavo-convex lens which consists of making a negative mold of the contour of an eyeball over which the finished lens is to be fitted, making a positive cast from said mold, modifying the contour of said cast to include necessary corneal and limbus clearances and any indicated correctional power, marking a plurality of meridional lines on said cast, placing said modified cast before a projector and projecting a silhouette of its contour along one of its meridians onto a calibrated chart, plotting a curve from the readings obtained from said chart, successively repositioning said cast before said projector and projecting silhouettes of its contours along other meridians onto said chart, plotting a curve of each silhouette, making a negative matrix embodying the contours of said plotted curves, and finally placing said matrix in a grinding machine to guide its grinder over the surface of a lens blank.

3. The method of producing a contact lens having a curvilinear surface defined by a plurality of meridional and annular curvatures having different radii which consists of making a negative mold of the contour of an eyeball over which the finished lens is to be fitted, making a positive cast from said mold, building up said cast to alter its contour to include necessary corneal and limbus clearances and any indicated correctional power, marking a plurality of meridional lines on said cast, placing said cast before a projector and projecting a silhouette of its contour along one of its meridians onto a calibrated chart, plotting a curve based upon the readings obtained from said chart, successively repositioning said cast before said projector and projecting silhouettes of the contours of its other meridians onto said chart, plotting a curve of each of said silhouettes, making a negative matrix embodying said plotted curves, and finally placing said matrix in a grinding machine to guide its grinder over the surface of a lens blank.

HUGH L. HUNTER.